United States Patent [19]

Suzuki et al.

[11] Patent Number: 5,142,571
[45] Date of Patent: Aug. 25, 1992

[54] DIGITAL TELEPHONE SET HAVING AN EMERGENCY SWITCHING FUNCTION AND COMMUNICATION SYSTEM HAVING THE SAME

[75] Inventors: Yutaka Suzuki, Yokohama; Shigehiko Yazawa, Kawasaki; Michihiro Hamada, Yokohama; Yoshiaki Inoue, Kawasaki, all of Japan

[73] Assignee: Fujitsu Limited, Kawasaki, Japan

[21] Appl. No.: 704,858

[22] Filed: May 21, 1991

Related U.S. Application Data

[63] Continuation of Ser. No. 423,896, Oct. 19, 1989, abandoned.

[30] Foreign Application Priority Data

Oct. 19, 1988 [JP] Japan .................. 63-263634
Feb. 17, 1989 [JP] Japan .................. 1-38773

[51] Int. Cl.⁵ .................................. H04M 3/10
[52] U.S. Cl. .................. 379/279; 379/2; 379/32
[58] Field of Search .......... 379/32, 33, 201, 219, 379/242, 2, 279

[56] References Cited

U.S. PATENT DOCUMENTS 4,575,584  3/1986  Smith et al. ............... 379/32 X
4,853,949  8/1989  Schorr et al. .............. 379/94

OTHER PUBLICATIONS

R. Sugioka et al., "Introduction of Digital PBX", Ohm corporation, Sep. 25, 1987, pp. 156-159.

Primary Examiner—James L. Dwyer
Assistant Examiner—Ahmad F. Matar
Attorney, Agent, or Firm—Staas & Halsey

[57] ABSTRACT

A digital telephone set includes a digital telephone circuit and an emergency analog circuit. Normally, the digital telephone circuit is made active so that a handset provided in common therewith is connected to a digital transmission line. In an emergency, the emergency analog circuit is made active instead of the digital telephone circuit so that the handset is connected to an analog transmission line. A dial key pad unit and a speaker are provided in common with the digital telephone circuit and the emergency analog circuit.

16 Claims, 6 Drawing Sheets

DIGITAL TELEPHONE SET HAVING AN EMERGENCY SWITCHING FUNCTION AND COMMUNICATION SYSTEM HAVING THE SAME

This application is a continuation of application Ser. No. 423,896, filed Oct. 19, 1989, incorporated by reference herein and now abandoned.

BACKGROUND OF THE INVENTION

The present invention generally relates to a digital telephone set having an emergency switching function, and a communication system having the same.

Recently, there has been considerable activity in the development of a private branch exchange system and terminal equipment coupled thereto, such as a digital telephone set. An advanced private branch exchange system is a digitized system. A digital telephone set is capable of providing various functions and services. Digital telephone sets coupled to a private branch exchange are supplied with power therefrom.

Generally, such a private branch exchange system is provided with an emergency switching device and an analog telephone set. Normally, an analog telephone set is coupled, through the emergency switching device, to an office trunk accommodated by a switch of the private branch exchange. When the private branch exchange stops operating due to a fault for example, the private branch exchange stops supplying the digital telephone sets with power. At this time, the analog telephone set is directly coupled to a public telephone line through the emergency switching system so as to directly communicate with an external telephone set outside of the private branch exchange system. That is, a subscriber (internal telephone user) can send the external telephone set a call or can receive a call sent therefrom.

FIG. 1 is a block diagram of a conventional private branch exchange system having an emergency switching device. Referring to FIG. 1, a digital telephone set 1 is accommodated by a digital subscriber circuit 7 connected to a PBX switch 3 of a private branch exchange PBX through a digital transmission line 6a. The digital telephone set 1 is supplied with power (direct current voltage) from the digital subscriber circuit 7 and serves as an extension telephone. An analog telephone set 2 is accommodated, through an analog transmission line 6b, by an emergency switching device 4 which is provided in the system along with the private branch exchange PBX.

The analog telephone set 2 is selectively connected, through the emergency switching device 4, to an office trunk 9 connected to the PBX switch 3. The emergency switching device 4 includes a first connecting path 4c, a second connecting path 4d, a third connecting path 4e, and two switching relays 4a and 4b. The first connecting path 4c connects a public telephone line 5 and the office trunk 9. The second connecting path 4d connects the public telephone line 5 and the analog transmission line 6b (the analog telephone set 2). The third connecting path 4e connects an analog type subscriber circuit (not shown) and the analog transmission line 6b. The switching relay 4a has two contacts $4a_1$ and $4a_2$, and the switching relay 4b has two contacts $4b_1$ and $4b_2$. The switching relays 4a and 4b are connected to ground, and on the other hand to a system operation supervisory control device 8 (hereinafter simply supervisory device 8) through a power line 6c. When the private branch exchange PBX is operating, a contact 8a provided in the supervisory device 8 is set in the closed (conducting) state so that a direct current voltage of $-48$ V (supervisory signal) is supplied to the switching relays 4a and 4b from the supervisory device 8 through the power line 6c.

While the switching relays 4a and 4b are supplied with a voltage of $-48$V, the public telephone line 5 and the office trunk 9 are mutually connected through the contacts $4a_2$ and $4b_2$ of the switching relays 4a and 4b. Further the second Connecting line 4d is set disconnected from the analog transmission line 6b by through the contacts $4a_1$ and $4b_1$ so that the analog telephone set 2 is disconnected from the office trunk 9. In this state, a terminating call from the public telephone line 5 is supplied to the office trunk 9 through the contacts $4a_2$ and $4b_2$. Then a predetermined terminating call procedure is subjected to the terminating call. For example, the terminating call is accepted by a public telephone line terminating board (not shown) connected to the PBX switch 3.

On the other hand, when the private branch system PBX stops operating due to the occurrence of a fault for example, the contact 8a of the supervisory device 8 is made open so that no power is supplied to the switching relays 4a and 4b through the signal line 6c. Thereby the switching relays 4a and 4b return to the original state. That is, the first connecting path 4c is disconnected from the public telephone line 5, and the second connecting path 4d is connected to the analog transmission line 6b. Normally, when a failure occurs in the private branch exchange PBX, no power is supplied with the digital telephone set 1 so that it stops operating.

An emergency switching device such as the aforementioned emergency switching device 4 is described in a paper: R. Sugioka et al., "INTRODUCTION OF DIGITAL PBX", Ohm corporation, Sep. 25, 1987, pp.156-159.

However, the private branch exchange system shown in FIG. 1 has the following disadvantages. First, the system is not economical because the analog telephone set 2 must be provided separately from the digital telephone set 1. Second, in a case where the analog telephone set 2 is located away from the digital telephone set 1, it is impossible to let the subscriber on the side of the digital telephone set 1 know the arrival of a call through the analog telephone set 2 which is made active in an emergency.

SUMMARY OF THE INVENTION

Accordingly, a general object of the present invention is to provide an improved digital telephone set and a communication system having the improved digital telephone set in an emergency in which the aforementioned disadvantages are eliminated.

A more specific object of the present invention is to provide a digital telephone set having an emergency switching function to thereby preclude the use of a separate analog telephone set.

The above objects of the present invention are achieved by a digital telephone set comprising digital communicating means for transmitting and receiving a digital signal with a digital transmission line connected to a private branch exchange, emergency communicating means for transmitting and receiving an analog signal with an analog transmission line connected to an office exchange, a telephone receiver/transmitter operative under the control of the emergency communicating means, fault detecting means for detecting the occurrence of a fault of the private branch exchange and generating a detection signal when detecting the occurrence of the fault, and switching means for connecting the telephone receiver/transmitter to the analog transmission line in response to the detection signal.

Another object of the present invention is to provide a communication system having the above-mentioned digital telephone set.

This object of the present invention are achieved by a communication system comprising a digital telephone set, a private branch exchange accommodating the digital telephone set, a supervisory device coupled to the private branch exchange, and an emergency switching device coupled to the digital telephone set. The digital telephone set has the same structure as described above. The supervisory device includes means for determining whether the private branch exchange is being supplying the digital transmission line with the external power and for generating a supervisory signal indicative of the determination result. The emergency switching device includes line switching means for connecting the analog transmission line to one of an external telephone line and the private branch exchange.

Additional objects, features and advantages of the present invention will become apparent from the following detailed description when read in conjunction with the accompanying drawings.

DESCRIPTION OF THE PREFERRED EMBODIMENTS

Figure 1:
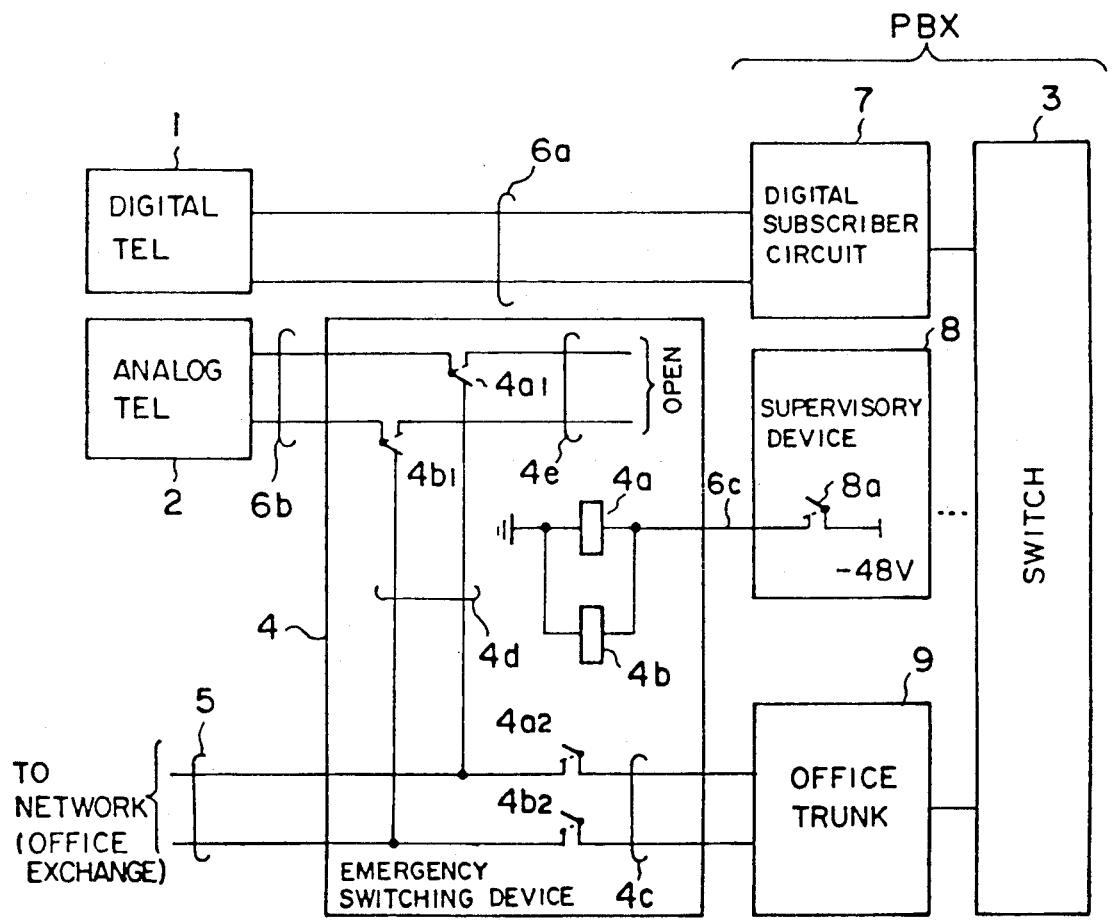
FIG. 1 is a block diagram of a conventional private branch exchange system.
Figure 2:
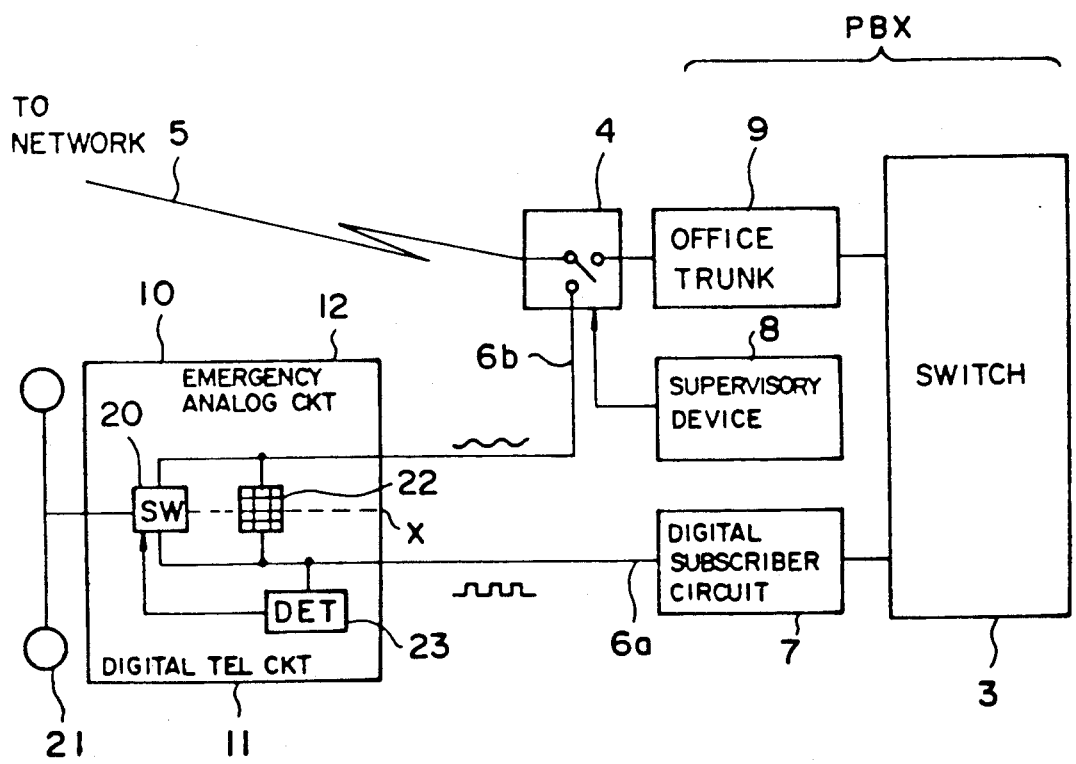
FIG. 2 is a block diagram illustrating the principle of the present invention.

A description is given of the principle of the present invention with reference to FIG. 2, in which those parts which are the same as those shown in FIG. 1 are given the same reference numerals.

Referring to FIG. 2, a digital telephone set 10 includes a digital telephone circuit 11 and an emergency analog circuit 12, which are schematically separated by a broken line X. The digital telephone circuit 11 is connected to the PBX switch 3 through the digital transmission line 6a and the digital subscriber circuit 7. The emergency analog circuit 12 is connected to either the public telephone line 5 through the analog transmission line 6b and the emergency switching device 4 or the PBX switch 3 through the analog transmission line 6b, the emergency switching device 4 and the office trunk 9. The digital telephone set 10 includes a switch 20, which selectively connects a handset 21 to one of the digital transmission line 6a and the analog transmission line 6b. A dial key pad unit 22 including a plurality of key pads is provided in common with the digital telephone circuit 11 and the emergency analog circuit 12. A power supply detection circuit 23, which is connected to the digital transmission line 6a, determines whether or not power is being supplied from the digital subscriber circuit 7 through the digital transmission line 6a, and outputs a detection signal indicative of the decision results.

Normally, the switch 20 selects the digital telephone circuit 11 so that the handset 21 is coupled to the digital transmission line 6a. Information (voice data and control data) is transferred between the digital telephone set 10 and the PBX switch 3, for example. If a fault occurs in the PBX switch 3, the digital subscriber circuit 7 stops supplying the digital telephone set 10 with power (−48 V for example). The power supply detection circuit 23 detects the stop of power supply and lets the switch 20 know it. Then the switch 20 switches its state so as to connect the handset 21 to the analog transmission line 6b. On the other hand, when the digital subscriber circuit 7 stops supplying the digital telephone set 10 with power, the supervisory device 8 controls the emergency switching device 4 so that it connects the public telephone line 5 to the analog transmission line 6b. Thereby, the digital telephone set 10 can communicate with an external terminal (network) through the emergency analog circuit 12, the analog transmission line 6b, the emergency switching device 4 and the public telephone line 5.

Figure 3:
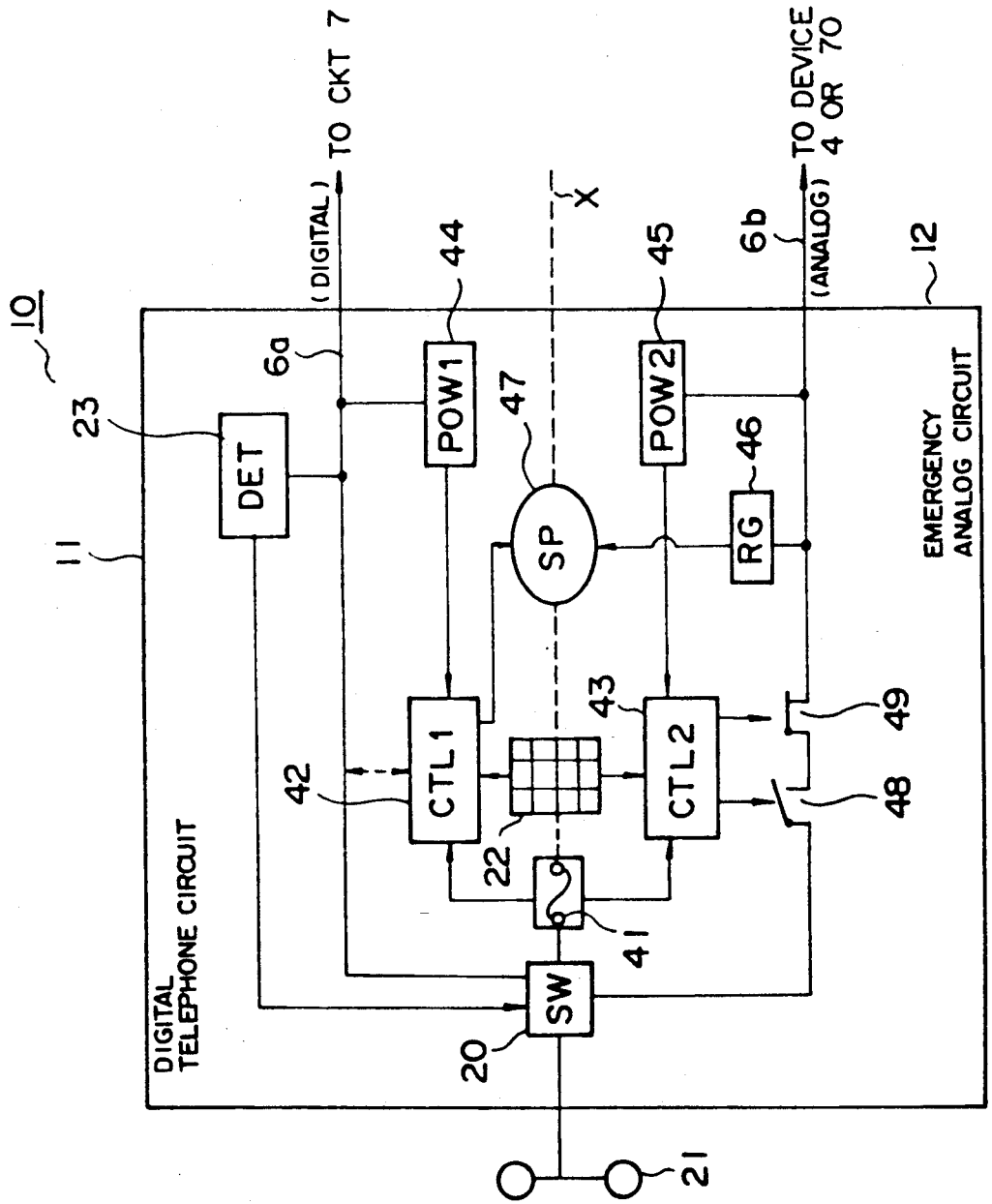
FIG. 3 is a block diagram of a first preferred embodiment of the present invention.

FIG. 3 is a block diagram of the detailed structure of the digital telephone set 10, in which those parts which are the same as those are given the same reference numerals. Referring to FIG. 3, the digital telephone circuit 11 includes a controller (CTL1) 42 and a power supply circuit (POW1) 44, which are coupled to the digital transmission line 6a. The power supply circuit 44 converts a voltage of −48 V supplied from the digital subscriber circuit 7 (FIG. 2) through the digital transmission line 6a into voltages (+5 V and −5 V for example) used in the digital telephone circuit 11. A DC/DC converter can serve as the power supply circuit 44. The converted voltages are supplied to the controller 42. The controller 42 controls the entire digital telephone circuit 11 as will be described later.

The emergency analog circuit 12 includes a controller (CTL2) 43, a power supply circuit (POW2) 45, a ringer detection circuit (RG) 46, a loop switch 48 and a dial switch 49. The power supply circuit 45 and the ringer detection circuit 46 are coupled to the analog transmission line 6b, and the switches 48 and 49 are provided in the analog transmission line 6b. The power supply circuit 45 converts a voltage of −48 V supplied from the network (not shown) through the analog transmission line 6b into voltages (+5 V and −5 V for example) used in the emergency analog circuit 12. The power supply circuit 45 can be formed by a DC/DC converter. The ringer detection circuit 46 is connected to the speaker 47 which is provided in common with the digital telephone set 11 and the emergency analog circuit 12. The controller 43 controls the emergency analog circuit 12. For example, the controller 43 controls the loop switch 48 and the dial switch 49. A hook switch 41 and the key pad unit 22 are connected to the controllers 42 and 43.

Normally, the switch 20 selects the digital telephone circuit 11, and allows the digital telephone set 10 to communicate with the PBX switch 3 through the digital transmission line 6a under the control of the controller 42.

It is now assumed that power supply to the private branch exchange PBX stops. In this case, power supply to the digital telephone circuit 11 through the digital transmission line 6a also stops. The power supply detection circuit 23 detects the stop of power supply, and controls the switch 20 so that it selects the emergency analog circuit 12. At the same time, the power supply circuit 44 stops supplying the controller 42 with the converted power. Thus, the digital telephone circuit 11 stops operating. On the other hand, the emergency switching device 4 connects the analog transmission line 6b to the public telephone line 5 as described previously. Thereby, the emergency analog circuit 12 is supplied with power through the public telephone line 5 and the analog transmission line 6b. Then the power supply circuit 45 supplies the controller 43 with the converted power. Thereby the emergency analog circuit 12 can function as an analog telephone set so that the digital telephone set 10 can communicate with a terminal through the public telephone line 5. For example, a subscriber takes the handset 21 and thereby the hook switch 41 is off-hooked, the controller 43 makes the loop switch 48 closed so that a power supply loop is established. Thereby a seizure signal to the office switch is generated. Then the controller 43 receives a select signal supplied from the dial key pad unit 22 and turns ON/OFF the dial switch 49. On the other hand, when a call from the public telephone line 5 is received through the emergency switching device 4 and the analog transmission line 6b, the ringer detection circuit 46 detects the received call, and activates the speaker 47. In response to ringing emitted from the speaker 47, the subscriber takes the handset 21 whereby the loop switch 48 is closed under the control of the controller 43.

When power supply to the private branch exchange PBX is recovered, the digital subscriber circuit 7 restarts supplying the digital telephone circuit 11 with power. The power supply detection circuit 23 detects the recovery of power supply, and controls the switch 20 so that it connects the handset 21 to the digital transmission line 6a. At the same time, the controller 42 is supplied with power from the power supply circuit 44 again. Thus, the digital telephone set 10 can communicate with the PBX switch 3. At the same time as power supply to the private branch exchange PBX is recovered, the supervisory device 8 controls the emergency switching device 4 so that the public telephone line 5 is connected to the office trunk 9. Thereby, power supply to the emergency analog circuit 12 is stopped.

Figure 4:
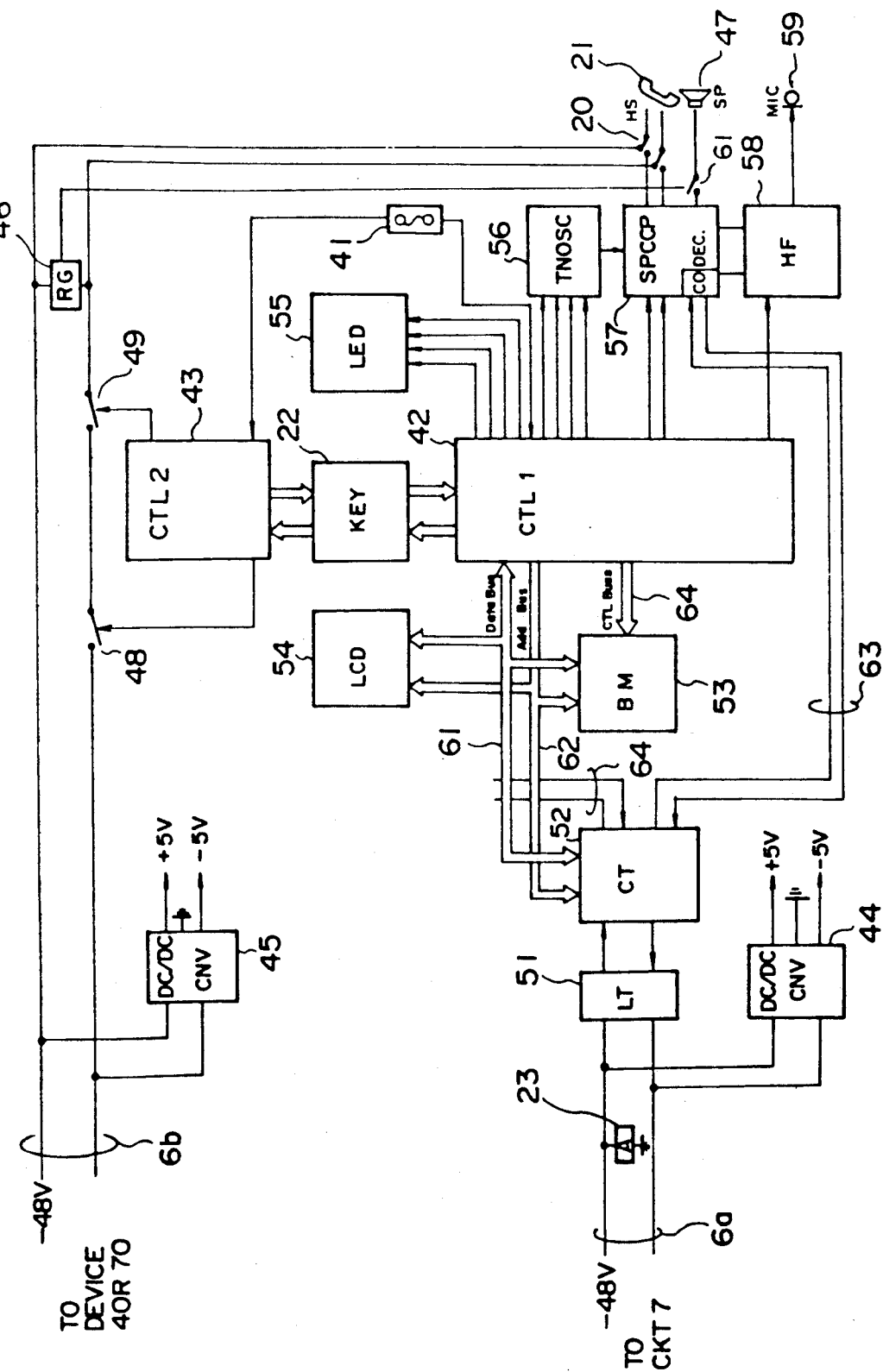
FIG. 4 is a block diagram of a more detailed configuration of the first embodiment.

A further description is given of the digital telephone set 10 shown in FIG. 3. FIG. 4 is a block diagram of a more detailed structure of the digital telephone set 10. In FIG. 4, those parts which are the same as those in FIGS. 2 and 3 are given the same reference numerals. The illustrated structure is designed to conform to the basic interface (2B+D) defined by the CCITT recommendation.

Referring to FIG. 4, the digital transmission line 6a is connected to a line termination unit (LT) 51, which performs the conversion from bipolar to unipolar and vice versa. A circuit termination unit (CT) 52 performs synchronization control, multiplexing and demultiplexing of voice (64 Kbps), data (64 Kbps) and signal (16 Kbps) channels, and generates timing signals. The circuit termination unit 52 is connected to the controller 42 through a data bus 61 and a control bus 62. A back-up memory (BM) 53 and a liquid crystal device (LCD) module 54 are coupled to the data bus 61 and the control bus 62. The LCD module 54 may be an optional unit. The back-up memory 53 stores data such as autodial numbers. If a power fault occurs, data is served by a back-up battery (not shown) for 10 days, for example. The back-up memory 53 is accessed by an address signal supplied from the controller 42 through an address bus 64. The LCD module 54, which is controlled by the controller 42, contains an LCD for displaying 20 characters x 2 lines, for example. A light-emitting device (LED) unit 55 includes LEDs, which emit light under the control of the controller 42.

Further, the digital telephone set 10 includes a tone oscillator (TNOSC) 56, a speech path circuit (SPCCP) 57 including a coder/decoder (CODEC), and a hands-free circuit (HF) 58 to which a microphone 59 is connected. The tone generator 56 generates tones (ringer, alarm and key-touch) under the control of the controller 42. The speech path circuit 57 performs mode switching between a handset mode and a hands-free mode, and drives the handset 21 and the speaker 47. A switch 61 (not shown in FIG. 3 for the sake of simplicity) is provided between the speech path circuit 57 and the speaker 47. The switch 61 connects the speaker 47 to either the speech path circuit 57 or the ringer detection circuit 46. The switches 20 and 61 are contacts of the power supply detection circuit 23, which is formed by a relay. The coder/decoder CODEC is connected to the circuit termination unit 52 through a signal line 63. The voice signal is transferred between the circuit termination unit 52 and the coder/decoder CODEC through the signal line 63. The hands-free circuit 58, which may be an optional unit, is controlled by the controller 42, and is made active in the hands-free mode.

The digital telephone circuit 11 includes the power supply detection circuit 23, the controller 42, the power supply circuit 44, the line termination unit 51, the circuit termination unit 52, the back-up memory 53, the tone oscillator 56, the speech path circuit 57 and the hands-free circuit 58.

The emergency analog circuit 12 includes the controller 43, the power supply circuit 45, the ringer detection circuit 46, the loop switch 48 and the dial switch 49. The handset 21, the dial key pad unit 22, the hook switch 41 and the speaker 47 are provided in common with the digital telephone circuit 11 and the emergency analog circuit 12. A data adapter (not shown) is connected to a signal line 64. Data relating to one of the two B channels is transferred on the signal line 63, and data relating to the other B channel is transferred on the signal line 64. The data adapter, which is an optional unit, converts the data transfer rate, format and level to provide a data interface (RS-232C).

Normally, the switches 20 and 61 connect the handset 21 and the speaker 47 to the speech path circuit 57. When a fault occurs in the private branch exchange PBX, power supply to the digital telephone circuit 11 stops. The power supply detection circuit 23 detects the stop of power supply. Thereby, the switch 20 connects the handset 21 to the analog transmission line 6b, and the switch 61 connects the speaker 47 to the ringer detection circuit 46.

In the case where the emergency switching device 4 shown in FIG. 1 is used, the following disadvantage may occur. When a fault occurs due to a specific event, power supply to the digital telephone circuit 11 from the digital subscriber circuit 7 is not always stopped.

For example, when a central process unit (not shown) provided in the private branch exchange PBX stops operating, the digital subscriber circuit 7 may continue to supply the digital telephone circuit 11 with power. In this case, the digital telephone set 10 cannot communicate with the PBX switch 3 through the digital telephone circuit 11 due to the fault of the central processing unit, whereas the emergency analog circuit 12 is not made active. That is, the digital telephone set 10 cannot function as an analog telephone set, which is arranged to receive a call from an external device or send a call thereto in an emergency, for example.

Figure 5:
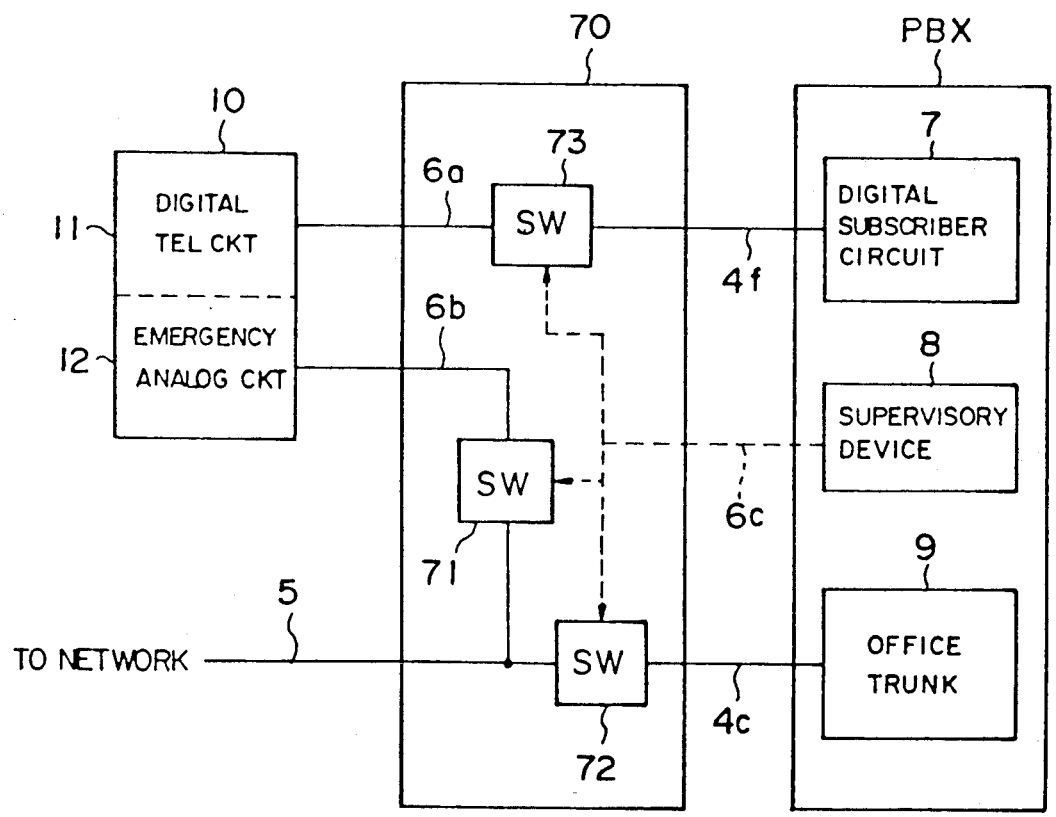
FIG. 5 is a block diagram illustrating the principle of a second embodiment of the present invention.

FIG. 5 illustrates the principle of a second embodiment directed to eliminating the aforementioned possibility. In FIG. 5, those parts which are the same as those shown in FIGS. 2 to 4 are given the same reference numerals. An essential feature of the second embodiment is present in the structure of an emergency switching device 70, which is substituted for the emergency switching device 4 shown in FIG. 2. The emergency switching device 70 includes switching circuits 71, 72 and 73. The switching circuit 71 corresponds to the aforementioned contacts $4a_1$ and $4b_1$, and the switching circuit 72 corresponds to the aforementioned contacts $4a_2$ and $4b_2$. The switching circuit 73 is provided in the digital transmission line 6a, and operates at the same time as the switching circuits 71 and 72 operate. The switching circuits 71, 72 and 73 are controlled by the supervisory device 8.

Normally, the switching circuit 71 disconnects the analog transmission line 6b from the second connecting path 4d, and the switching circuit 72 connects the public telephone line 5 to the office trunk 9. Further, the switching circuit 73 connects the digital transmission line 6a to the digital subscriber circuit 7 through a fourth connecting path 4f. When a fault occurs in the private branch exchange PBX, the supervisory device 8 controls the switching circuits 71, 72 and 73 as follows. That is, the switching circuit 71 connects the analog transmission line 6b to the public telephone line 5, and the switching circuit 72 disconnects the first connecting path 4c from the public telephone line 5. Further, the switching circuit 73 disconnects the digital transmission line 6a from the digital subscriber circuit 7. Thereby, the emergency analog circuit 12 is made active, and on the other hand, the digital telephone circuit 11 is made inactive without exception. With the arrangement shown in FIG. 5, it becomes possible to always receive a terminating call directed to the digital telephone set 10 through the public telephone line 5 while the digital telephone circuit 11 is in the inactive state.

Figure 6:
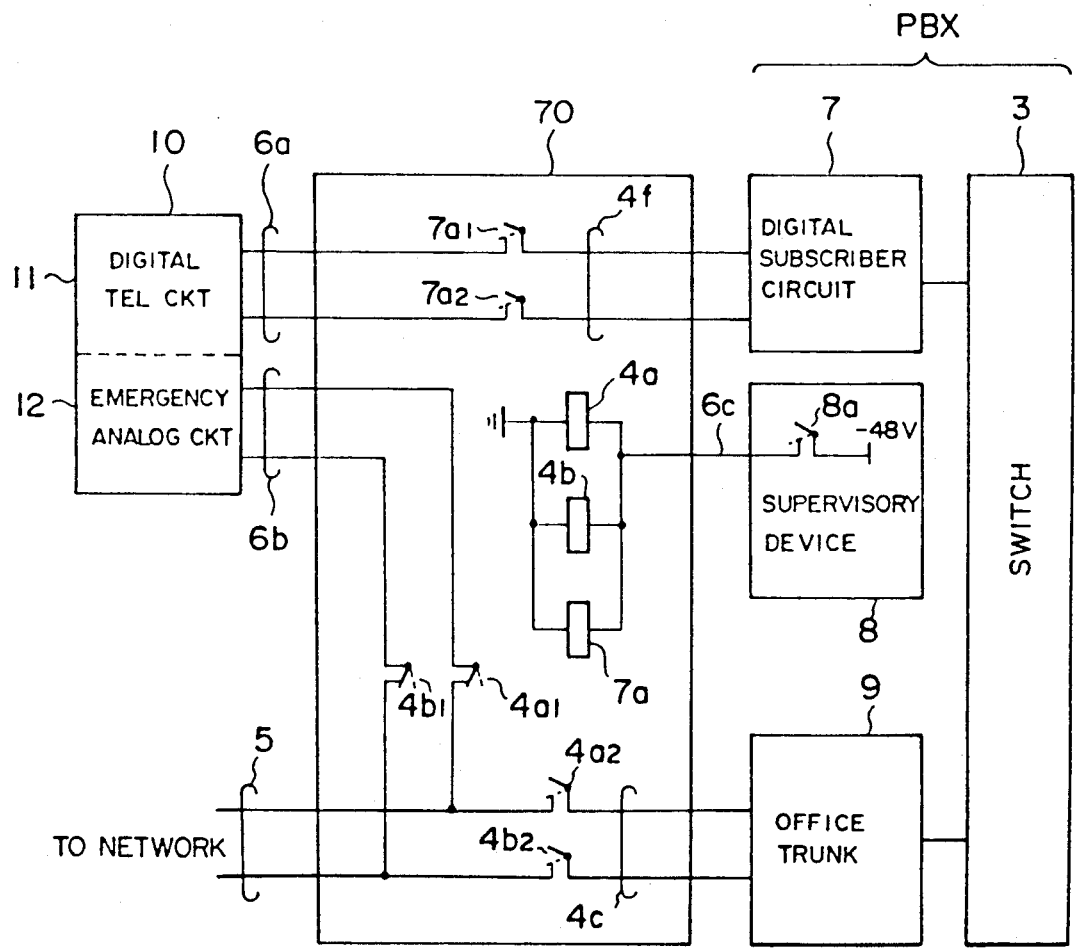
FIG. 6 is a block diagram of a more detailed configuration of the second embodiment.

FIG. 6 is a block diagram of a detailed structure for the emergency switching device 70 shown in FIG. 5. Referring to FIG. 6, a switching relay 7a and its contacts $7a_1$ and $7a_2$ are added to the configuration shown in FIG. 1. The switching relay 7a is connected to the switching relays 4a and 4b in parallel. The contacts $7a_1$ and $7a_2$ connect the digital transmission line 6a to the fourth connecting path 4f or disconnect the same therefrom. When the private branch exchange PBX is operating correctly, a voltage of −48 V is supplied to the switching relays 4a, 4b and 7a from the supervisory device 8 through the power line 6c. In the state where the switching relays 4a, 4b and 7a are operating, the contacts $4a_2$ and $4b_2$ connect the first connecting path 4c and the public telephone line 5, and the contacts $4a_1$ and $4b_1$ disconnect the second connecting path 4d from the public telephone line 5. Further, the contacts $7a_1$ and $7a_2$ connect the digital transmission line 6a and the fourth connecting path 4f. In this state, a call from the public telephone line 5 is received by the office trunk 9 and is then terminated by the public telephone line terminating board (not shown) coupled to the PBX switch 3. The digital telephone circuit 11 is provided with DC power from the digital subscriber circuit 7 and is kept active so that it can serve as an extension telephone. On the other hand, the emergency analog circuit 12 is kept inactive.

Alternatively, when the private branch exchange PBX stops operating, the contact 8a of the supervisory device 8 is made open so that no voltage is applied to the switching relays 4a, 4b and 7a. Thereby, the contacts $4a_2$ and $4b_2$ are made open and the contacts $4a_1$ and $4b_1$ are closed. Further, the contacts $7a_1$ and $7a_2$ are made open. As a result, the analog transmission line 6b becomes connected to the public telephone line 5, and the office trunk 9 is disconnected from the public telephone line 5. The digital telephone circuit 11 is disconnected from the digital subscriber circuit 7. Thus, the digital subscriber circuit 7 stops supplying the digital telephone circuit 11 with DC power, and the emergency analog circuit 12 is supplied with DC power through the public telephone line 5. Thereby, the digital telephone circuit 11 is made inactive, whereas the emergency analog circuit 12 is made active. In this case, a call from the public telephone line 5 is terminated by the digital telephone set 10 under the control of the emergency analog circuit 12 without exception.

When the private branch exchange PBX restarts operating, the DC voltage is supplied to the switching relays 4a, 4b and 7a. Then the system operates as described previously.

It is noted that alternatively the switching relays 4a, 4b and 7a can be replaced by a single multi-contact relay or an electronic switch. The dial switch 49 shown in FIG. 4 can be replaced by a dual tone multi-frequency generator. It is noted that although the aforementioned figures illustrate a single digital telephone set, in actuality, a plurality of digital telephone sets are accommodated in the private branch exchange.

The present invention is not limited to the aforementioned embodiments, and variations and modifications may be made without departing from the scope of the present invention.

What is claimed is:

1. A digital telephone set operatively connected to a private branch exchange by a digital transmission line, comprising:

digital communicating means for transmitting and receiving a digital signal over the digital transmission line to and from the private branch exchange, said digital communicating means includes, first power supply means for deriving power from external power supplied from the private branch exchange through the digital transmission line;

emergency communicating means for transmitting and receiving an analog signal over an analog transmission line operatively connected to an office exchange;

a telephone receiver/transmitter means for operating under control of said emergency communicating means;

fault detecting means for detecting a fault of the private branch exchange by detecting a loss of the power supplied from the private branch exchange through the digital transmission line and for generating a detection signal when detecting the loss of the power; and switching means for connecting said telephone receiver/transmitter means to said analog transmission line in response to the detection signal.

2. A digital telephone set as claimed in claim 1, wherein said switching means includes means for connecting said digital transmission line to said telephone receiver/transmitter means when said first power supply means detects the power from the private branch exchange and for connecting said analog transmission line to said telephone receiver/transmitter means when said first power supply means detects no supply of the power from the private branch exchange.

3. A digital telephone set as claimed in claim 1, wherein said fault detecting means includes a relay.

4. A digital telephone set as claimed in claim 1, wherein said telephone receiver/transmitter means includes a handset, and wherein said digital telephone set further comprises a hook switch which cooperates with said handset and is operatively connected in common with said digital communicating means and said emergency communicating means.

5. A digital telephone set as claimed in claim 1, further comprising:

a loop switch provided in said analog transmission line and used for establishing a power supply loop relating to said analog transmission line, wherein said emergency communicating means controls said loop switch.

6. A digital telephone set as claimed in claim 1, further comprising:

ringer detecting means including a ringer for detecting a call directed to said digital telephone set and for driving said ringer.

7. A communication system comprising:

a digital transmission line;

a digital telephone set;

a private branch exchange operatively connected to said digital telephone set by said digital transmission line;

a supervisory device coupled to the private branch exchange; and an emergency switching device coupled to said digital telephone set, said digital telephone set including:

digital communicating means for transmitting and receiving a digital signal over said digital transmission line to the private branch exchange, said digital communicating means includes, first power supply means for deriving power from external power supplied from the private branch exchange through the digital transmission line, emergency communicating means for transmitting and receiving an analog signal over an analog transmission line to an office exchange, a telephone receiver/transmission means for operating under control of said emergency communicating means, fault detecting means for detecting the occurrence of a fault of the private branch exchange by detecting a loss of the power supplied from the private branch exchange through the digital transmission line and for generating a detection signal when detecting the loss of the power, switching means for connecting said telephone receiver/transmitter means to said analog transmission line in response to said detection signal, said supervisory device including means for determining whether the private branch exchange is supplying said digital transmission line with external power through said digital transmission line and for generating a supervisory signal indicative of the supplying, said emergency switching device including line switching means for connecting said analog transmission line to one of an external telephone line and the private branch exchange.

8. A communication system as claimed in claim 7, wherein said line switching means of said emergency switching device includes:

a first contact provided between said emergency communicating means and said external telephone line, a second contact provided between said external telephone line and the private branch exchange, and a third contact provided in said digital transmission line provided between said digital communicating means and the private branch exchange, and wherein said first, second and third contacts are controlled by the supervisory signal supplied from said supervisory device.

9. A communication system as claimed in claim 8, wherein said emergency switching device includes:

a relay having said first, second and third contacts, and means to receive the supervisory signal supplied from said supervisory device.

10. A communication system as claimed in claim 7, wherein said line switching means of said emergency switching device includes means for connecting said analog transmission line to the private branch exchange when said supervisory device detects that the private branch exchange is supplying said digital transmission line with the external power.

11. A communication system as claimed in claim 7, wherein said line switching means of said emergency switching device includes means for connecting said analog transmission line to said external telephone line when said supervisory device detects that the private branch exchange is supplying said digital transmission line with no external power.

12. A communication system as claimed in claim 7, wherein said switching means includes:

means for connecting said digital transmission line to said telephone receiver/transmitter means when said first power supply means detects the power from the private branch exchange and for connecting said analog transmission line to said telephone receiver/transmitter means when said first power supply means detects no supply of the power from the private branch exchange.

13. A digital telephone set as claimed in claim 7, wherein said fault detecting means includes a relay.

14. A digital telephone set as claimed in claim 7, wherein said telephone receiver/transmitter means includes a handset, and wherein said digital telephone set further comprises a hook switch which cooperates with said telephone receiver/transmitter means and is connected in common with said digital communicating means and said emergency communicating means.

15. A digital telephone set as claimed in claim 7, further comprising:

a loops switch provided in said analog transmission line and used to establish a power supply loop relating to said analog transmission line, and wherein said emergency communicating means controls said loop switch.

16. A digital telephone set as claimed in claim 7, further comprising:

ringer detecting means having a ringer for detecting a call directed to said digital telephone set and for driving said ringer.

* * * * *